United States Patent [19]

Cowan

[11] 3,758,760

[45] Sept. 11, 1973

[54] ERROR DETECTION FOR ARITHMETIC AND LOGICAL UNIT MODULES

[75] Inventor: Joseph Lamar Cowan, Crossville, Ala.

[73] Assignee: Honeywell Information Systems Inc., Waltham, Mass.

[22] Filed: Apr. 7, 1972

[21] Appl. No.: 242,175

[52] U.S. Cl. .......... 235/153 BB
[51] Int. Cl. .......... G06f 11/10
[58] Field of Search .......... 235/153 BB

[56] References Cited

UNITED STATES PATENTS

| | | | |
|---|---|---|---|
| 3,649,817 | 3/1972 | Keller et al. | 235/153 BB |
| 3,342,983 | 9/1967 | Pitkowsky et al. | 235/153 BB |
| 3,078,039 | 2/1963 | Anderson | 235/153 BB |

*Primary Examiner*—Felix D. Gruber
*Assistant Examiner*—R. Stephen Dildine, Jr.
*Attorney*—Edward W. Hughes et al.

[57] ABSTRACT

A modular error detector for an adder of the type which provides both arithmetic and logical functions and incorporates carry-look-ahead addition is described. The error detector includes parity prediction of logical and arithmetic terms together with partial duplication. Error checking of four bit arithmetic/logic modules is integrated with error checking of the carry-look-ahead unit. Also, check parity generation and testing of the operands is integrated with the parity prediction.

5 Claims, 12 Drawing Figures

ERROR DETECTION FOR ARITHMETIC AND LOGICAL UNIT MODULES

FIELD OF THE INVENTION

This invention relates to error checking for arithmetic/logic units which are fabricated as integrated circuits.

DESCRIPTION OF THE PRIOR ART

Integrated circuits are subject to failure, primarily due to bonding and metalization defects. However, a representative MTBF, mean time between failures, is 100,000,000 operating hours. For a large computer system, this results in an MTBF of six to seven months for a processor failure. Error detection can be used to effectively improve this performance figure or any other one. Various techniques have been used for error checking of arithmetic and logical circuits and systems. A survey of error checking practices is presented in "Error Detecting Logic" by F. F. Sellers et al., McGraw-Hill, 1968.

In general, the most economical approach is parity prediction, when it is implemented skillfully into the basic circuit design. However, for an arithmetic/logic unit, having a pair of four bit input operands and a carry-in, the unit having a complexity on the order of one hundred gates and supports carry-look-ahead logic, parity prediction is not satisfactory when all, or large portions, of the unit are fabricated as a single integrated circuit chip without parity prediction checking built into intermediate logic levels. This is due to the fact that an error, after propagation through several levels of logic, is often undetectable. Nondetection results because multiple bits may be affected so that an odd or even checker cannot detect the error condition. In such cases, a standard approach is to use duplication and comparison.

The use of duplication and comparison can greatly increase the mean time between failures, but no error detection technique can insure absolute error detection. Also, duplication itself does not detect failure in the transfer of operands. When operand check bits are generated and checked, together with comparison of duplicated arithmetic/logic units, the additional number of gates required is two to three times the number of gates required for the original unit. Furthermore, the provision of an operand check bit generator requires three levels of logic after the sum bits are generated so that an adder is slowed down.

Accordingly, it is an object of the invention to provide error detection, for an arithmetic/logic unit, which has a level of logic complexity no greater than the complexity of the arithmetic/logic unit.

It is a further object of the invention to provide a modular error detector unit for an adder, comprised of a plurality of arithmetic/logic units and carry-look-ahead units, which has less logic complexity than the adder units checked and which reduced undetected errors by an order of magnitude.

It is another object of the invention to provide an adder error detector which provides error detection, including transfer in errors, without increasing the number of logic levels for generating the sum bits and a parity bit.

SUMMARY OF THE INVENTION

It has been found that if error prediction on a four bit arithmetic/logic unit is augmented by logic gates for duplicating the carry-out generation and appropriate comparators, both the arithmetic/logic units and the carry-look-ahead units can be checked with an error detection probability exceeding 90° and the check bit is made available at the same time as the sum bit is available. Furthermore, by using the exclusive OR function parity prediction logic with a comparator, the operand transfer in is checked, while the error detection logic complexity is limited to the level of the arithmetic/logic unit's logic complexity. Conveniently, a single integrated circuit, or a fraction thereof, is provided for each four bits of the input operands.

DETAILED DESCRIPTION OF A PREFERRED EMBODIMENT OF THE INVENTION

Figure 1:
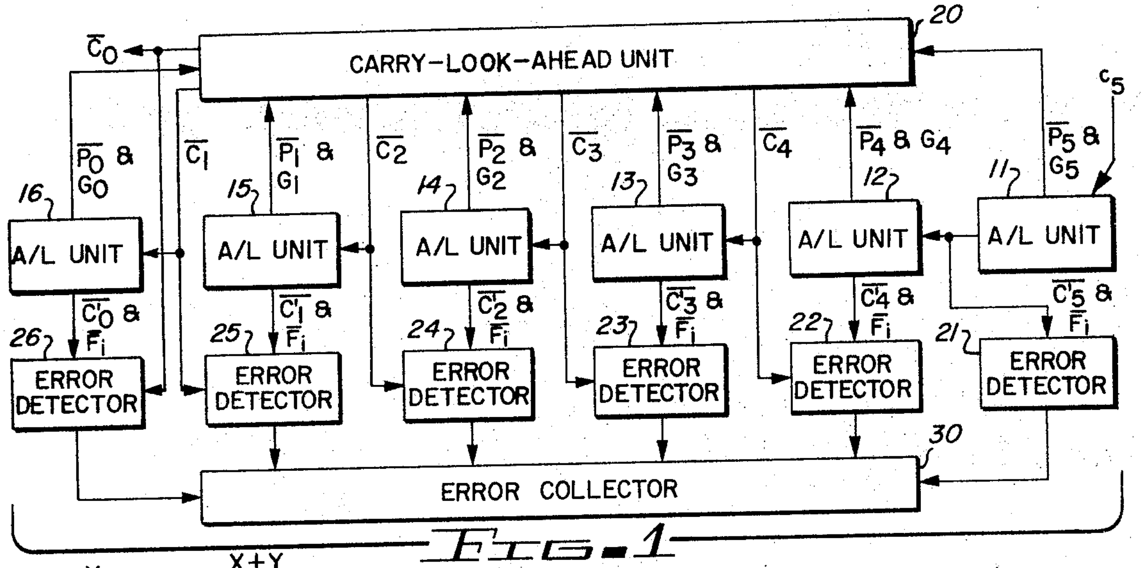
FIG. 1 is a block diagram of a 24 bit adder incorporating the error detector.

In FIG. 1, the adder is comprised of a set of six arithmetic/logic units 11–16, carry-look-ahead unit 20, six error detection units 21–26, and a composite error detector 30 which combines (ORs) the outputs of units 21–26. Each arithmetic/logic unit 11–16 receives as inputs two four bit sets, $\overline{X}_{0-3}$ and $\overline{Y}_{0-3}$, from respective operands, a set of function selection signals, $\overline{K}_A$ and $\overline{K}_O$, which select the desired arithmetic or logical function of the unit, such as add, logical OR, logical exclusive OR, etc., and a carry-in signal, $\overline{C}_i$. It produces outputs $\overline{F}_j$, for respective bit position $X_j$ and $Y_j$, for $j=0, 1, 2, 3$, and carry-look-ahead signals $\overline{P}_n$, $\overline{G}_n$ and $\overline{C'}_N$ for N = 5, 4, 3, 2, 1, 0. The inputs and outputs are in complement form for system convenience. The carry-look-ahead outputs $\overline{P}_N$ and $\overline{G}_N$ are applied to the carry-look-ahead units. Except for the lowest order, the carry-look-ahead units provide carry-ins $C_N$ for the respective arithmetic/logic units 11–16. The error detectors 21–26 monitor the input operands, the arithemtic/logic units and the carry-look-ahead units.

Figures 2, 4A:
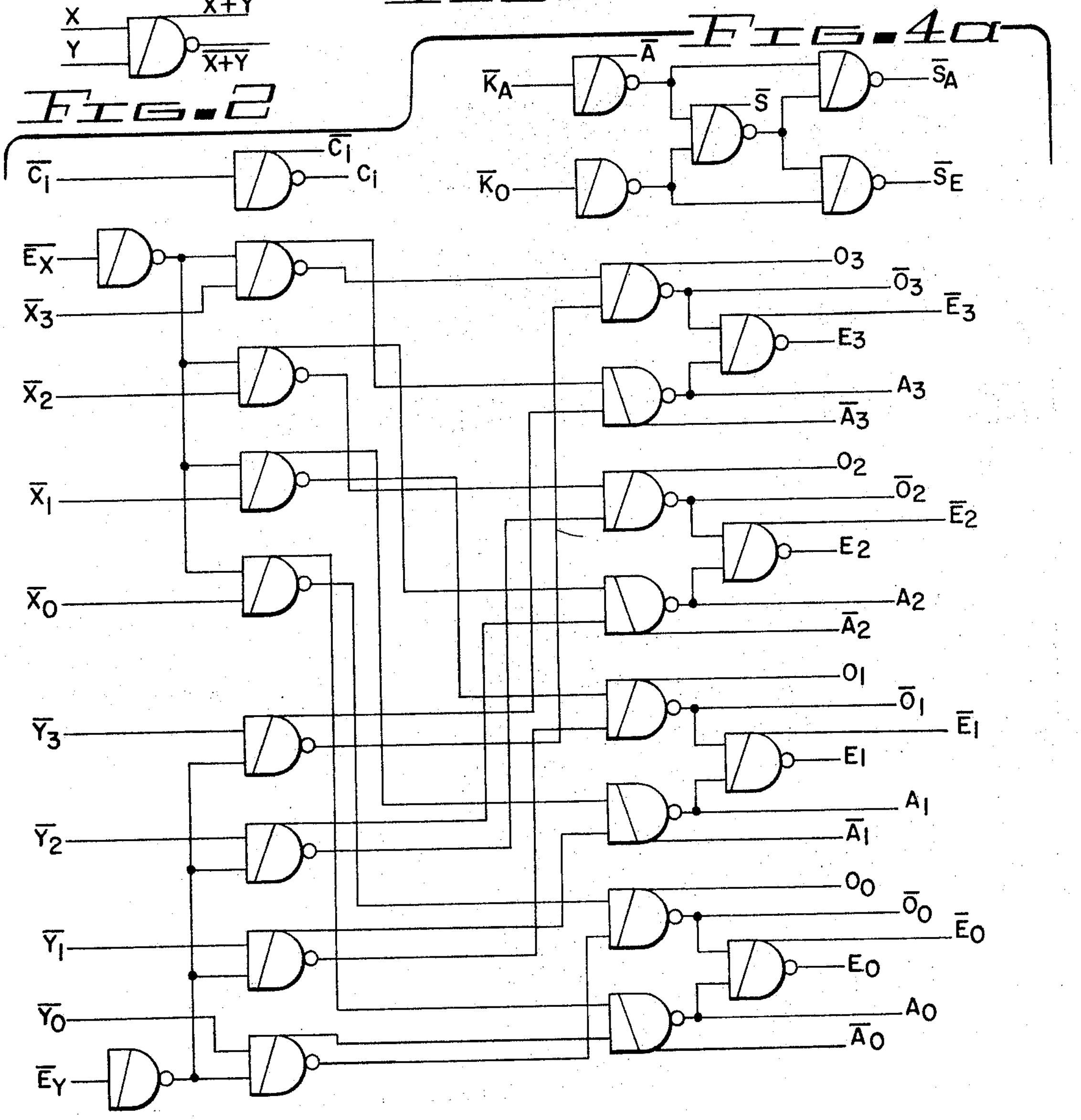
FIG. 2 is a diagram of a NOR-/OR gate used in FIGS. 3 and 4.

The first level of the arithmetic/logic unit gates, which may be of the same form as shown in FIG. 4a, regenerates, and forms the complements of the operands $X_j$ and $\overline{Y}_j$ ($j=0-3$) and of the carry-in $\overline{C}_i$. The second level forms the elementary AND and OR functions:

$$A_j = X_j + Y_j,\ \overline{A}_j = \overline{X_j + Y_j},\ O_j = \overline{\overline{X}}_j + \overline{\overline{Y}}_j,\ \overline{O}_j = \overline{X_j + Y_j}.$$

$$\text{OR outputs} = O_j = \overline{\overline{X}}_j + \overline{\overline{Y}}_j,\ \text{hence, NOR outputs} = \overline{O}_j = \overline{X_j + Y_j}$$

$$\text{OR outputs} = \overline{A}_j = \overline{X}_j + \overline{Y}_j,\ \text{hence, NOR outputs} = \overline{\overline{A}}_j = \overline{\overline{X}_j + \overline{Y}_j} = X_j\, Y_j$$

From these, the exclusive OR functions are formed at a third level:

$$\text{OR outputs} = \overline{E}_j = \overline{O}_j + A_j,\ \text{hence, NOR outputs} = \overline{\overline{E}}_j = \overline{\overline{O}_j + A_j} = O_j\, \overline{A}_j$$

In parallel, convenient intermediate functions are generated $S_1 = O_0 + O_1$, $S_2 = A_0 + A_1$, $S_3 = \overline{A_0 + A_1}$, and $S_4 = O_2 + \overline{(O_0 + A_1 + A_2} + \overline{O_1 + A_2)}$. Also, the function selection term $S = K_A + K_O$, is formed. The output sum bits, $F_j$, are formed with tied-OR gates as follows:

$$\overline{F}_0 = [(C_N + \overline{E}_0 + \overline{S}) \cdot (\overline{C_N + E_0 + \overline{S}})] \cdot (\overline{A_0 + \overline{A}}) \cdot (\overline{E_0 + \overline{K}_0})$$

$$\overline{F}_1 = [(E_1 + \overline{O}_0 + \overline{C}_N + \overline{S}) \cdot (\overline{A}_0 + E_1 + \overline{S}) \cdot (\overline{E}_1 + A_0 + C_N + \overline{S}) \cdot (\overline{E}_1 + O_0 + \overline{S})] \cdot (\overline{A_1 + \overline{K}_A}) \cdot (\overline{E_1 + \overline{K}_0})$$

$$\overline{F}_2 = [(\overline{C}_t + E_2 + S_1 + \overline{S}) \cdot (E_2 + \overline{C}_N + S_3 + \overline{S}) \cdot (C_N + \overline{E}_2 + S_2 + \overline{S}) \cdot (\overline{E}_2 + \overline{O}_1 + \overline{S}) \cdot (A_1 + \overline{E}_2 + O_0 + \overline{S})] \cdot (\overline{A_1 + \overline{K}_A}) \cdot (\overline{E_2 + K_0})$$

$$\overline{F}_3 = [(\overline{E}_3 + S_4 + \overline{S}) \cdot (S_3 + A_2 + \overline{E}_3 + C_N + \overline{S}) \cdot (\overline{A}_2 + E_3 + \overline{S}) \cdot (\overline{O}_1 + \overline{O}_2 + S_2 + E_3 + \overline{S}) \cdot (\overline{O}_0 + S_1 + E_3 + \overline{C}_N + \overline{S})] \cdot (\overline{E_3 + \overline{K}_0}) \cdot (\overline{A_3 + \overline{K}_A})$$

Also, signals for carry-look-ahead and carry-out are formed:

$$\overline{C}_{N\text{-}1} = (\overline{0}_0 + \overline{0}_1 + \overline{0}_2 + \overline{0}_3 + \overline{C}_N) \cdot (\overline{A}_0 + \overline{0}_1 + \overline{0}_2 + \overline{0}_3) \cdot (\overline{A}_1 + \overline{0}_2 + \overline{0}_3) \cdot (\overline{A}_2 + \overline{0}_3) \cdot \overline{A}_3$$

$$\overline{P}_{N\text{-}1} = (\overline{0}_0 + \overline{0}_1 + \overline{0}_2 + \overline{0}_3) \cdot (\overline{A}_0 + \overline{0}_1 + \overline{0}_2 + \overline{0}_3) \cdot (\overline{A}_1 + \overline{0}_2 + \overline{0}_3)\ (\overline{A}_2 + \overline{0}_3) \cdot \overline{A}_3$$

$$G_{N\text{-}1} = A_0 \cdot 0_1 \cdot 0_2 \cdot 0_3 + A_1 \cdot 0_2 \cdot 0_3 + A_2 \cdot 0_3 + A_3$$

Figure 3:
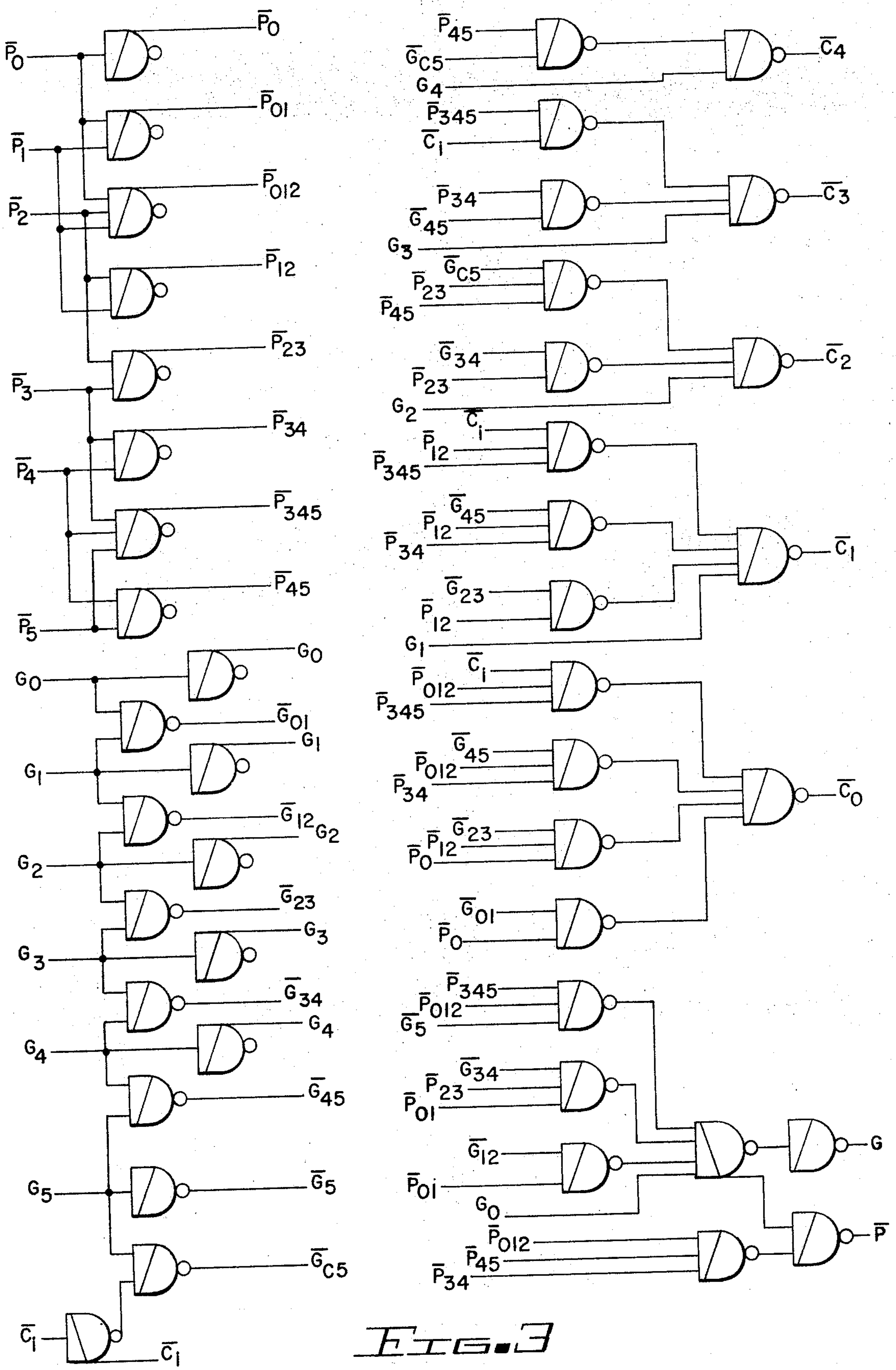
FIG. 3 is a logic diagram of a six bit carry-look-ahead unit, suitable for use in the FIG. 1 adder. FIGS. **4*a*–4*i* are logic diagrams of an error detector unit for the FIG. 1** adder.

For high speed arithmetic operations, these logic equations are preferably produced with NOR/OR gates, of the type shown in FIG. 2, which is the type of gate used in FIGS. 3 and 4a-i. FIG. 3 constitutes a six bit carry-look-ahead unit. The first level, produces the following intermediate terms:

$$\overline{P}_{01} = \overline{\overline{P}_0 + \overline{P}_1} \qquad \overline{G}_{01} = \overline{G_0 + G_1}$$
$$\overline{P}_{012} = \overline{\overline{P}_0 + \overline{P}_1 + \overline{P}_2} \qquad \overline{G}_{12} = \overline{G_1 + G_2}$$
$$\overline{P}_{12} = \overline{\overline{P}_1 + \overline{P}_2} \qquad \overline{G}_{23} = \overline{G_2 + G_3}$$
$$\overline{P}_{23} = \overline{\overline{P}_2 + \overline{P}_3} \qquad \overline{G}_{34} = \overline{G_3 + G_4}$$
$$\overline{P}_{34} = \overline{\overline{P}_3 + \overline{P}_4} \qquad \overline{G}_{45} = \overline{G_4 + G_5}$$
$$\overline{P}_{345} = \overline{\overline{P}_3 + \overline{P}_4 + \overline{P}_5} \qquad \overline{G}_{c5} = \overline{c_t + G_5}$$
$$\overline{P}_{45} = \overline{\overline{P}_4 + \overline{P}_5}$$

Also, each of the P and G terms are preferably regenerated to support the fan-out required for the second level, FIG. 3. The carry-in for the third arithmetic/logic unit 13 is:

$$\overline{C}_4 = \overline{\overline{\overline{P}_{45} + \overline{G}_{c5}} + G_4} = \overline{P_{45} \cdot G_{c5} + G_4}$$

Similarly, higher order carrys are formed as follows:

$$\overline{C}_3 = \overline{\overline{\overline{c}_t + \overline{P}_{345}} + \overline{\overline{P}_{34} + \overline{G}_{45}} + G_3}$$

$$\overline{C}_2 = \overline{\overline{\overline{G}_{c5} + \overline{P}_{23} + \overline{P}_{45}} + \overline{\overline{P}_{23} + \overline{G}_{34}} + G_2}$$

$$\overline{C}_1 = \overline{\overline{\overline{c}_t + \overline{P}_{12} + \overline{P}_{345}} + \overline{\overline{P}_{12} + \overline{P}_{34} + \overline{G}_{45}} + \overline{\overline{P}_{12} + \overline{G}_{23}} + G_1}$$

$$\overline{C}_0 = \overline{\overline{\overline{c}_t + \overline{P}_{012} + \overline{P}_{345}} + \overline{\overline{P}_{012} + \overline{P}_{34} + \overline{G}_{45}} + \overline{\overline{P}_0 + \overline{G}_{01}} + \overline{\overline{G}_{23} + \overline{P}_{12} + \overline{P}_0}}$$

Figures 4B, 4C, 4D, 4E, 4I:
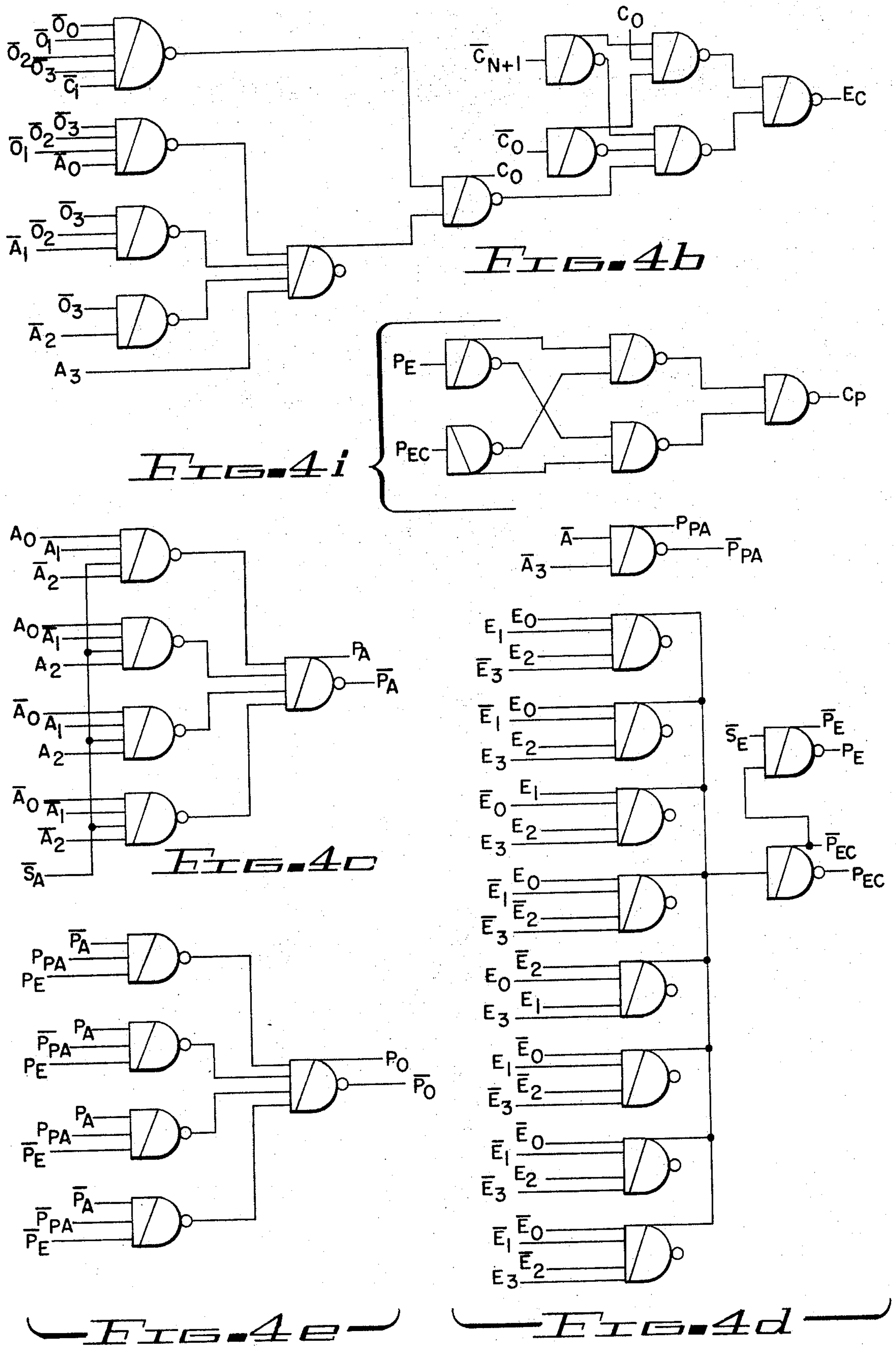

FIG. 4*a–h* constitute the error detection logic of error detector units 21–26 in FIG. 1. FIGS. 4*a* and 4*b* duplicate the carry-look-ahead portions of the arithmetic/logic units 11–16. FIG. 4*a* duplicates the first three levels of logic producing the terms $0_j$, $A_j$ and $E_j$ for respective bit pairs, $j = 0, 1, 2, 3$, of the input operands $X_j$ and $Y_j$. From these terms the carry-out is generated as follows:

$$\overline{C}'_{N-1} + \overline{\overline{\overline{C}_N + \overline{0}_0 + \overline{0}_1 + \overline{0}_2 + \overline{0}_3} + \overline{\overline{A}_0 + \overline{0}_1 + \overline{0}_2 + \overline{0}_3} + \overline{\overline{A}_1 + \overline{0}_2 + \overline{0}_3} + \overline{\overline{A}_2 + \overline{0}_3} + A_3}$$

The output $\overline{c}'_o$ is then compared with both the arithmetic/logic unit output $\overline{c}_o$ and the carry-look-ahead output $\overline{c}_n$. As a result, both the carry-look-ahead unit 30 and the carry section of the arithmetic/logic units are checked simultaneously. Also, because the first two levels of these are common to all functions, partial error detection is provided for all other functions.

Figures 4F, 4G, 4H:
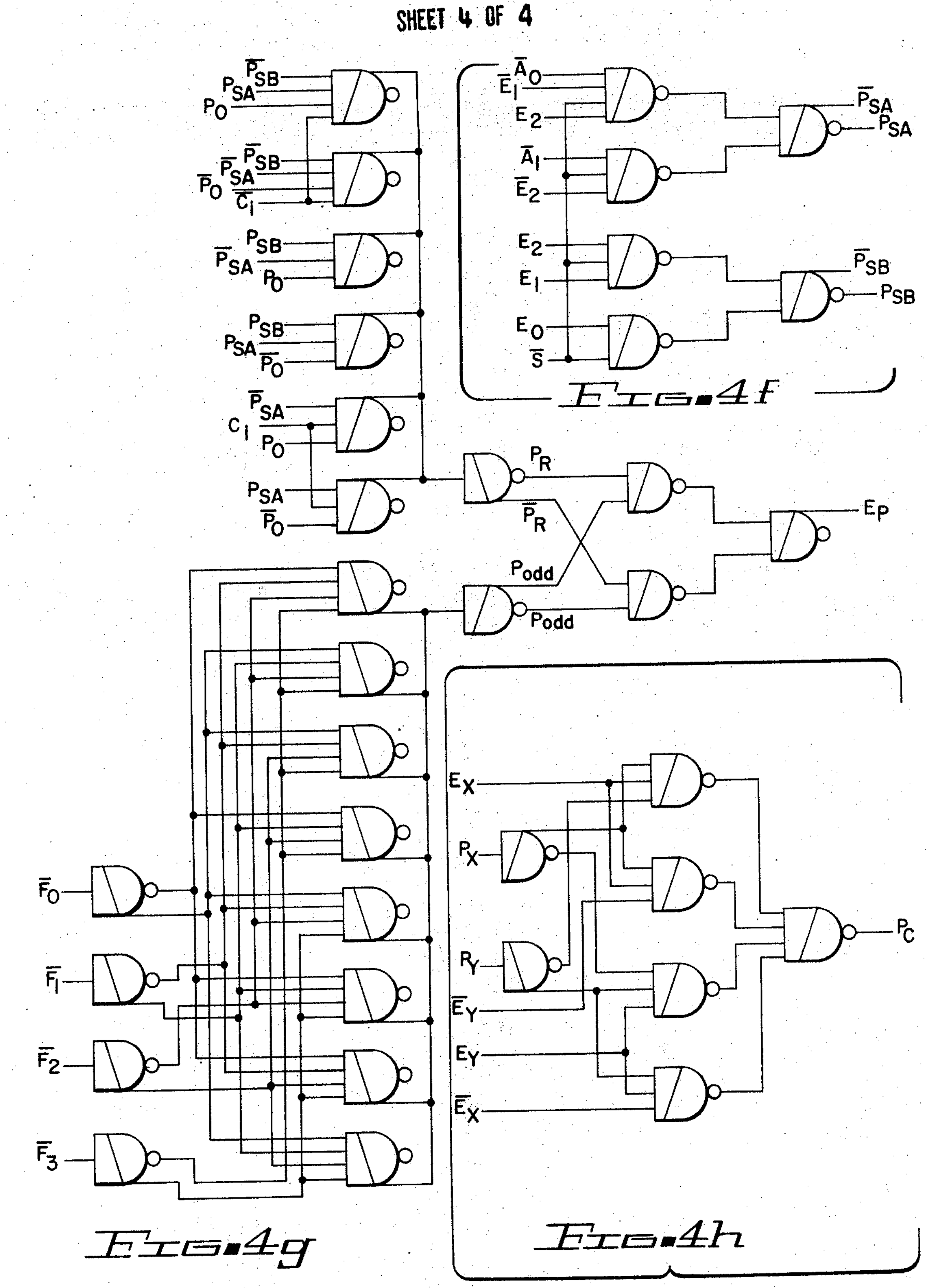

However, the primary error detection for the logical functions AND, OR, exclusive OR, and sum is provided by the respective parity prediction network FIGS. 4*c–f* together with the parity comparator, FIG. 4*g*. In FIG. 4*c* the AND parity term is formed:

$$P_A = \overline{A_0 + A_1 + \overline{A}_2 + \overline{S}_A} + \overline{A_0 + \overline{A}_1 + A_2 + \overline{S}_A} + \overline{\overline{A}_0 + A_1 + A_2 + \overline{S}_A} + \overline{\overline{A}_0 + \overline{A}_1 + \overline{A}_2 + \overline{S}_A}, \text{ and}$$

$$P_{PA} = A + A_3$$

In FIG. 4*d*, the parity term $P_{EC}$ and its complement are formed:

$$\overline{P}_{EC} = (E_0 + E_1 + E_2 + \overline{E}_3) + (\overline{E}_0 + E_1 + \overline{E}_2 + E_3) + (E_0 + \overline{E}_1 + E_2 + E_3) + (\overline{E}_0 + E_1 + E_2 + E_3) + (E_0 + \overline{E}_1 + \overline{E}_2 + \overline{E}_3) + (\overline{E}_0 + E_1 + \overline{E}_2 + \overline{E}_3) + (\overline{E}_0 + \overline{E}_1 + E_2 + \overline{E}_3) + (E_0 + \overline{E}_1 + \overline{E}_2 + E_3)$$

In FIG. 4*e*, an intermediate OR parity term $P_0$ is formed:

$$P_0 = \overline{\overline{P}_A + P_{PA} + P_{EC}} + \overline{P_A + \overline{P}_{PA} + P_{EC}} + \overline{P_A + P_{PA} + \overline{P}_{EC}} + \overline{\overline{P}_A + \overline{P}_{PA} + \overline{P}_{EC}}$$

Also, in FIG. 4*f* an intermediate sum parity term is formed:

$$\overline{P}_{SA} = \overline{\overline{A}_0 + \overline{E}_1 + E_2 + \overline{S}} + \overline{\overline{A}_1 + \overline{E}_2 + \overline{S}}$$

$$\overline{P}_{SB} = \overline{E_1 + E_2 + \overline{S}} + \overline{E_0 + \overline{S}}$$

These terms are combined as follows:

$$\overline{P}_R = (P_{SA} \cdot \overline{P}_{SB} + P_0 + \overline{c}_t) + (\overline{P}_{SA} + \overline{P}_{SB} + \overline{P}_0 + c_t) + P_{SA} + P_{SB} + \overline{P}_0) + (P_{SA} + P_{SB} + \overline{P}_0) + (\overline{P}_{SA} + P_0 + c_t) + (P_{SA} + \overline{P}_0 + c_t)$$

FIGS. 4*d* and 4*i* show the transfer error check with a check bit $S_E$:

$$P_E = P_{EC} \cdot S_E \text{ and } C_P = P_E \cdot P_{EC} + \overline{P}_E \cdot \overline{P}_{EC}$$

These terms are compared with the parity generator of FIG. 4g for arithmetic/logic unit outputs:

$$P_{ODD} = (F_0 + F_1 + F_2 + F_3) + (\overline{F}_0 + \overline{F}_1 + F_2 + F_3) + (\overline{F}_0 + F_1 + \overline{F}_2 + F_3) + (F_0 + \overline{F}_1 + \overline{F}_2 + F_3) + (\overline{F}_0 + F_1 + F_2 + F_3) + (F_0 + \overline{F}_1 + F_2 + \overline{F}_3) + (F_0 + F_1 + \overline{F}_2 + \overline{F}_3) + (\overline{F}_0 + \overline{F}_1 + \overline{F}_2 + \overline{F}_3)$$

For the carry-look-ahead logic of FIG. 3, it will be noted that the propagate term is not the conventional propagate term, but it is effectively the OR sum of the conventional propagate and generate terms, but this does not affect the logic. This point is stressed as an example of the possible variations in logic. The invention is not concerned with the specific logic used for the generation of the arithmetic, logical and carry-look-ahead functions, because the logic for these functions are equivalents, by definition of the functions.

The embodiment disclosed operated upon four bits. Although a larger number of bits may be checked by a single unit, the increase in gates, etc., is geometrical. An exception to this factor is that the function of checking input operands can be performed on an eight bit or greater basis, but this results in more than three levels of logic, which may slow down the adder.

Similarly, the number of bits processed by the adder can be any multiple of four. It is preferable to have the original four bit arithmetic/logic fabricated as a single integrated circuit chip. Correspondingly, it is desirable to have the error detection logic of FIG. 4 fabricated on a single integrated circuit chip. Because the complexity of the error detection unit has been limited to the level of the other units, this is feasible. More generally, if the units are fabricated on more than one chip, or a multiple of four bit arithmetic/logic unit were fabricated on a single chip, the error detection units are compatible.

It is understood that the invention should not be construed as being limited to the form of embodiment described and shown herein which has been given by way of example only, as many modifications and variations may be made by those skilled in or conversant in the art without departing from the gist and scope of the invention.

What is claimed is:

1. In an adder having a plurality of arithmetic/logic units responsive to a pair of four bit operands, a set of function selection signals and a carry-in signal, for selectively generating arithmetic and logical functions, including carry-look-ahead signals; a carry-look-ahead unit, responsive to said carry-look-ahead signals, for generating carry signals; error detecting logic including:

A. elementary logic forming the AND, OR and exclusive OR functions of respective bit pairs, each bit being from one of the input operands;

B. AND prediction logic means, responsive to said elementary functions, for generating an AND function parity signal;

C. exclusive OR prediction logic means, responsive to said elementary functions, for generating an exclusive OR function parity signal;

D. check bit generating means, responsive to said prediction logic means and the function selection signals, for generating a parity check bit;

E. operand checking means, responsive to said exclusive OR prediction means and input operand check bits, for detecting erroneous transfer in of the input operands;

G. duplicating carry-look-ahead logic means, responsive to said elementary functions, for generating carry-look-ahead signals;

H. carry error detecting means, responsive to said duplicate carry-look-ahead signals, the arithmetic logic unit's carry-out signal, and a carry-look-ahead unit's output, for detection of errors in these units.

2. The error detecting logic of claim 1, further comprising:

I. grouping said error detecting logic into portions for processing pairs of four bits of the operands.

3. The error detecting logic of claim 2, further comprising:

J. a single integrated circuit for realizing a multiple of the grouped logic of pairs of four bits of operands.

4. The adder of claim 1, further comprising:

I. primary elementary logic forming the AND, OR and exclusive OR functions of respective four bit pairs;

J. adder logic means, responsive to said primary elementary logic, for selectively generating arithmetic sums and logical functions of the input pairs;

K. carry-look-ahead logic, responsive to said primary elementary logic, for providing carry, carry propagate and carry generate signals.

5. The adder of claim 4, further comprising:

L. a plurality of arithmetic and logical units realized in respective integrated circuits;

M. a plurality of carry-look-ahead integrated circuits;

N. a plurality of error detecting logic integrated circuits, responsive to respective said arithmetic and logical units and said carry-look-ahead logic.

* * * * *